Patented Aug. 25, 1931

1,820,085

UNITED STATES PATENT OFFICE

THOMAS A. MOORMANN, OF MILWAUKEE, WISCONSIN, ASSIGNOR TO THE SHALER COMPANY, OF WILMINGTON, DELAWARE, A CORPORATION OF DELAWARE

LIQUID HEAT TRANSFERRING COMPOSITION

No Drawing.    Application filed March 2, 1929.  Serial No. 344,104.

My invention relates to improvements in liquid heat transferring compositions. The object of my invention is to provide a heat transferring fluid peculiarly adapted for use in vulcanizer chambers as a heat storing and distributing medium.

More particularly stated, my object is to provide a composition having a boiling point considerably above the degree of temperature required for vulcanization, a non-freezing characteristic, a non-decomposing or precipitating characteristic under vulcanizing temperatures, and a minimum tendency to vaporization under such temperatures, with no tendency to develop unpleasant or irritating fumes and odors.

Further objects are to provide a liquid for the above stated purpose, the major portion of which may consist of glycerin without the objectionable characteristics of glycerin for such purposes by reason of its high viscosity, decomposing tendencies and the development of objectionable fumes.

My improved composition is composed of commercial glycerin, derived as a by-product from the soap industry, to which has been added from 10 to 20% of ethylene glycol, preferably containing approximately 1% of water. The preferred quality of glycerin used in my composition is commercially known as "pale straw" glycerin. Exactness in proportion is not material, and the percentages may be determined by either weight or volume, the proportions above given being the preferred range.

I have discovered that a mixture containing from 80 to 90% of glycerin as above specified, and 20 to 10% of ethylene glycol containing approximately 1% water, will remain permanently mixed, and that the boiling point of the mixture will be only slightly lower than that of the glycerin, the boiling point being far above that required for ordinary vulcanizing operations. The vapors above the mixture when heated to a vulcanizing temperature, ranging from 240° F. to 300° F., are almost wholly vapors of ethylene glycol and they are not decomposed by air. The ethylene glycol protects the glycerin against decomposition, and the only change occurring in the mixture after prolonged heating is a slight loss of ethylene glycol when the mixture is heated in an open container.

Owing to the high boiling point of the mixture, it may be heated in a substantially closed chamber if room is allowed for expansion, and no danger of explosion is encountered. The mixture may be heated in any chamber of the type disclosed in Letters Patent of the United States to G. H. Tuttle, #663,308, dated December 4, 1900, with or without a safety valve. It may also be employed in vulcanizing apparatus of the general type shown in Letters Patent to W. C. Merrill, #1,287,071, dated December 10, 1918, or that shown in a patent to B. W. Franklin #33,464, dated October 8, 1861, or that shown in Letters Patent to M. O. Kasson, #1,427,109, dated August 29, 1922, or in any other vulcanizer having a chamber for a fluid heat distributing medium.

Owing to the fact that my improved composition will not corrode, precipitate or bake upon the surfaces of the container, containers with safety valves may be freely used. The valves will not open under ordinary vulcanizing temperatures, even though the valves are held closed under light pressure, such, for example, as their own gravity or even under the pressure of a spring, if sufficient room is left within the chamber for the expansion of the liquid. Any usual or excess pressure, due either to excess liquid or excess heating thereof, will be instantly relieved because the valve will not become corroded or stuck to its seat in such a manner as to resist abnormal pressure developing within the receptacle.

While I have described my invention as a composition peculiarly adapted for use in vulcanizer cavities, for heat modification and distribution, it will be understood that it is also adapted for a great variety of similar uses or use for any purpose where a circulatory or heat transferring liquid having a high vaporizing point is required.

I claim:

1. A heat transferring liquid adapted to serve as a distributing medium in vulcanizing operations consisting of a major portion of glycerin and a minor portion of ethylene glycol, the latter containing a small quantity of water.

2. A heat transferring liquid composition adapted for use as a heat distributing medium for vulcanizers, comprising glycerin mixed with a small proportion of ethylene glycol (approximately 10% to 20%), said ethylene glycol containing about 1% of water.

THOMAS A. MOORMANN.